US009835260B2

(12) United States Patent
Yamaguchi

(10) Patent No.: US 9,835,260 B2
(45) Date of Patent: Dec. 5, 2017

(54) SPOOL VALVE

(71) Applicant: ADVICS CO., LTD., Kariya-shi (JP)

(72) Inventor: Tomoyuki Yamaguchi, Kariya (JP)

(73) Assignee: ADVICS CO., LTD., Kariya, Aichi-Pref. (JP)

(*) Notice: Subject to any disclaimer, the term of this patent is extended or adjusted under 35 U.S.C. 154(b) by 306 days.

(21) Appl. No.: 14/371,674

(22) PCT Filed: Jan. 25, 2013

(86) PCT No.: PCT/JP2013/051605
§ 371 (c)(1),
(2) Date: Jul. 10, 2014

(87) PCT Pub. No.: WO2013/111859
PCT Pub. Date: Aug. 1, 2013

(65) Prior Publication Data
US 2015/0013808 A1 Jan. 15, 2015

(30) Foreign Application Priority Data

Jan. 25, 2012 (JP) ................. 2012-012970

(51) Int. Cl.
F16K 11/07 (2006.01)
F16K 47/02 (2006.01)
(Continued)

(52) U.S. Cl.
CPC .......... F16K 11/0716 (2013.01); B60T 7/042 (2013.01); B60T 13/162 (2013.01);
(Continued)

(58) Field of Classification Search
CPC .. B60T 7/042; B60T 13/162; Y10T 137/2544; Y10T 137/86694;
(Continued)

(56) References Cited

U.S. PATENT DOCUMENTS 3,945,301 A * 3/1976 Buente ................. B60T 13/162
91/391 R
4,128,112 A * 12/1978 Brown ................. B60T 13/162
137/544
(Continued)

FOREIGN PATENT DOCUMENTS

JP 60-99365 U 7/1985
JP 4-31372 U 3/1992
(Continued)

OTHER PUBLICATIONS

International Search Report (PCT/ISA/210) dated May 7, 2013, by the Japanese Patent Office as the International Searching Authority for International Application No. PCT/JP2013/051605.
(Continued)

Primary Examiner — Kevin Murphy
Assistant Examiner — Kelsey Rohman
(74) Attorney, Agent, or Firm — Buchanan Ingersoll & Rooney PC

(57) ABSTRACT

A spool valve V1 includes a valve element 11 and a cylinder 12 having a bore 12a which accommodates the valve element 11 to be movable in an axial direction. In this spool valve V1, when the valve element 11 in an initial position moves in the axial direction in relation to the cylinder 12, a supply valve port Vi formed between the valve element 11 and the cylinder 12 opens, whereby a working fluid is introduced from a hydraulic pressure source into a hydraulic chamber through the supply valve port Vi. A throttle portion O1 is provided in a fluid channel formed on the hydraulic chamber side of the supply valve port Vi. The throttle portion O1 is configured such that in a throttle valid region which extends from the initial position to a position where the amount of axial movement of the valve element 11 from the initial position becomes equal to a predetermined value, the area of the opening formed between the valve element 11
(Continued)

and the cylinder 12 is constant, and in a throttle invalid region where the amount of axial movement of the valve element 11 exceeds the predetermined value, the area of the opening increases. Thus, it becomes possible to restrain occurrence of oil impact within the hydraulic chamber to which the working fluid is supplied through the spool valve V1.

2 Claims, 6 Drawing Sheets

(51) Int. Cl.
    *B60T 7/04*       (2006.01)
    *B60T 13/16*     (2006.01)
    *F15B 7/08*       (2006.01)

(52) U.S. Cl.
    CPC .............. *F16K 11/07* (2013.01); *F16K 47/02* (2013.01); *F15B 7/08* (2013.01); *Y10T 137/8671* (2015.04)

(58) Field of Classification Search
    CPC ....... Y10T 137/8671; Y10T 137/86574; Y10T 137/8667; F16K 11/0716; F16K 11/07; F16K 31/0613; F16K 47/02; F16K 47/06; F15B 13/0402
    USPC ....... 137/102, 625.69, 625.2, 625.67, 625.25
    See application file for complete search history.

(56) References Cited

U.S. PATENT DOCUMENTS 5,682,744 A * 11/1997 Hasegawa .............. B62D 5/087
                                                       137/625.3
2003/0024581 A1     2/2003  Nakamura et al.

FOREIGN PATENT DOCUMENTS

| JP | 5-66374 U | 9/1993 |
|----|-----------|--------|
| JP | 2001-138894 A | 5/2001 |
| JP | 2002-310309 A | 10/2002 |

OTHER PUBLICATIONS

Written Opinion (PCT/ISA/237) dated May 7, 2013, by the Japanese Patent Office as the International Searching Authority for International Application No. PCT/JP2013/051605.

* cited by examiner

SPOOL VALVE

TECHNICAL FIELD

The present invention relates to a spool valve; for example, a spool valve suitable for a hydraulic brake apparatus of a vehicle.

BACKGROUND ART

A spool valve suitable for a hydraulic brake apparatus of a vehicle is disclosed in, for example, the below listed Patent Document 1. The disclosed spool valve includes a valve element (spool) and a cylinder (sleeve) which has a bore for accommodating the valve element to be movable in the axial direction. This spool valve is configured such that when the valve element in an initial position moves in the axial direction in relation to the cylinder, a supply valve port formed between the valve element and the cylinder opens, whereby working fluid is introduced from a hydraulic pressure source into a hydraulic chamber through the supply valve port.

PRIOR ART DOCUMENT

Patent Document

Patent Document 1: Japanese Patent Application Laid-Open (kokai) No. 2003-310309

SUMMARY OF THE INVENTION

Incidentally, in the spool valve disclosed in Patent Document 1, as the opening area of the supply valve port formed between the valve element and the cylinder increases gradually in accordance with the axial movement amount of the valve element, the flow rate of the working fluid introduced from the hydraulic pressure source into the hydraulic chamber through the supply valve port increases gradually. Therefore, when the degree of charging of the working fluid within the hydraulic chamber reaches a certain level, so-called oil impact (which provides various adverse effects on the apparatus) may occur.

The present invention has been made so as to restrain occurrence of the above-described oil impact, and provides a spool valve which comprises a valve element and a cylinder having a bore which accommodates the valve element to be movable in an axial direction and which is configured such that when the valve element in an initial position moves in the axial direction in relation to the cylinder, a supply valve port formed between the valve element and the cylinder opens, whereby a working fluid is introduced from a hydraulic pressure source into a hydraulic chamber through the supply valve port, wherein a throttle portion is provided in a fluid channel formed between the supply valve port and the hydraulic pressure source or a fluid channel formed between the supply valve port and the hydraulic chamber, the throttle portion being configured such that the area of an opening formed between the valve element and the cylinder is constant in a throttle valid region which extends from the initial position to a position where the amount of axial movement of the valve element from the initial position becomes equal to a predetermined value, and the area of the opening increases in a throttle invalid region where the amount of axial movement of the valve element exceeds the predetermined value.

In the spool valve of the present invention, the above-described throttle portion is provided in the fluid channel formed on the hydraulic pressure source side of the supply valve port or the fluid channel formed on the hydraulic chamber side of the supply valve port. Therefore, when the spool valve is set such that the degree of charging of the working fluid within the hydraulic chamber reaches a certain level in the throttle valid region of the throttle portion, the flow rate of the working fluid supplied to the hydraulic chamber at the time when the degree of charging of the working fluid within the hydraulic chamber reaches the certain level can be decreased as compared with the case where the throttle portion is not provided, whereby occurrence of oil impact within the hydraulic chamber can be restrained.

In the spool valve of the present invention, occurrence of oil impact within the hydraulic chamber is restrained by the throttle portion, and, in the throttle invalid region where the axial movement amount of the valve element from the initial position exceeds the predetermined value, the opening area of the above-described throttle portion increases. Therefore, it is possible to restrain an increase in the amount of axial movement of the valve element in relation to the cylinder as compared with the case where a fixed throttle is provided in the fluid channel formed on the hydraulic pressure source side of the supply valve port or in the fluid channel formed on the hydraulic chamber side of the supply valve port in order to reduce the flow rate of the working fluid supplied to the hydraulic chamber at the time when the degree of charging of the working fluid within the hydraulic chamber reaches a certain level, such that no oil impact occurs (in this case, since the supply flow rate is reduced by the fixed throttle at all times, the amount (time) of axial movement of the valve element in relation to the cylinder must be increased as needed in order to secure the fluid supply amount necessary in the hydraulic chamber). Thus, it becomes possible to restrain an increase in the overall length of the spool valve to a possible extent.

The above-described present invention may be implemented such that the throttle portion is provided at a position which is axially shifted by a predetermined amount from an end of an outer circumferential surface of the valve element, which end forms the supply valve port; the throttle portion is formed by a wall surface of the bore of the cylinder and a throttle-forming surface which is formed on the outer circumferential surface of the valve element and which has a predetermined width; and an annular groove is formed between the throttle-forming surface and the end of the outer circumferential surface of the valve element, which end forms the supply valve port. In this case, the throttle valid region can be set properly by properly setting the length of the annular groove in the axial direction.

The above-described present invention may be implemented such that the throttle portion is provided at a position which is axially shifted by a predetermined amount from an end of a wall surface of the bore of the cylinder, which end forms the supply valve port; the throttle portion is formed by an outer circumferential surface of the valve element and a cylindrical protrusion which has a predetermined thickness and is formed along the entire circumference of an inner end of a communication hole formed in the cylinder and communicating with the bore of the cylinder at the inner end thereof; and a recess is formed between the cylindrical protrusion and the end of the wall surface of the bore of the cylinder, which end forms the supply valve port. In this case, the throttle valid region can be set properly by properly setting the length of the recess in the axial direction. Also, in this case, the communication hole and the cylindrical protrusion may be formed by a pipe which is fluid-tightly assembled to the cylinder. In this case, the degree of throttling at the throttle portion can be readily adjusted by changing the amount of insertion (fitting) of the pipe into the cylinder.

The above-described present invention may be implemented such that the throttle portion is provided at a position which is axially shifted by a predetermined amount from an end of a wall surface of the bore of the cylinder, which end forms the supply valve port; the throttle portion is formed by an outer circumferential surface of the valve element and a flange-shaped protrusion which projects from the wall surface of the bore of the cylinder toward the outer circumferential surface of the valve element at a position between an inner end of a communication hole formed in the cylinder and communicating with the bore of the cylinder at the inner end thereof and the end of the wall surface of the bore of the cylinder, which end forms the supply valve port, the flange-shaped protrusion annularly extending about the axis of the valve element; and a recess is formed between the flange-shaped protrusion and the end of the wall surface of the bore of the cylinder, which end forms the supply valve port. In this case, the throttle valid region can be set properly by properly setting the length of the recess in the axial direction.

MODE FOR CARRYING OUT THE INVENTION

Figure 1:
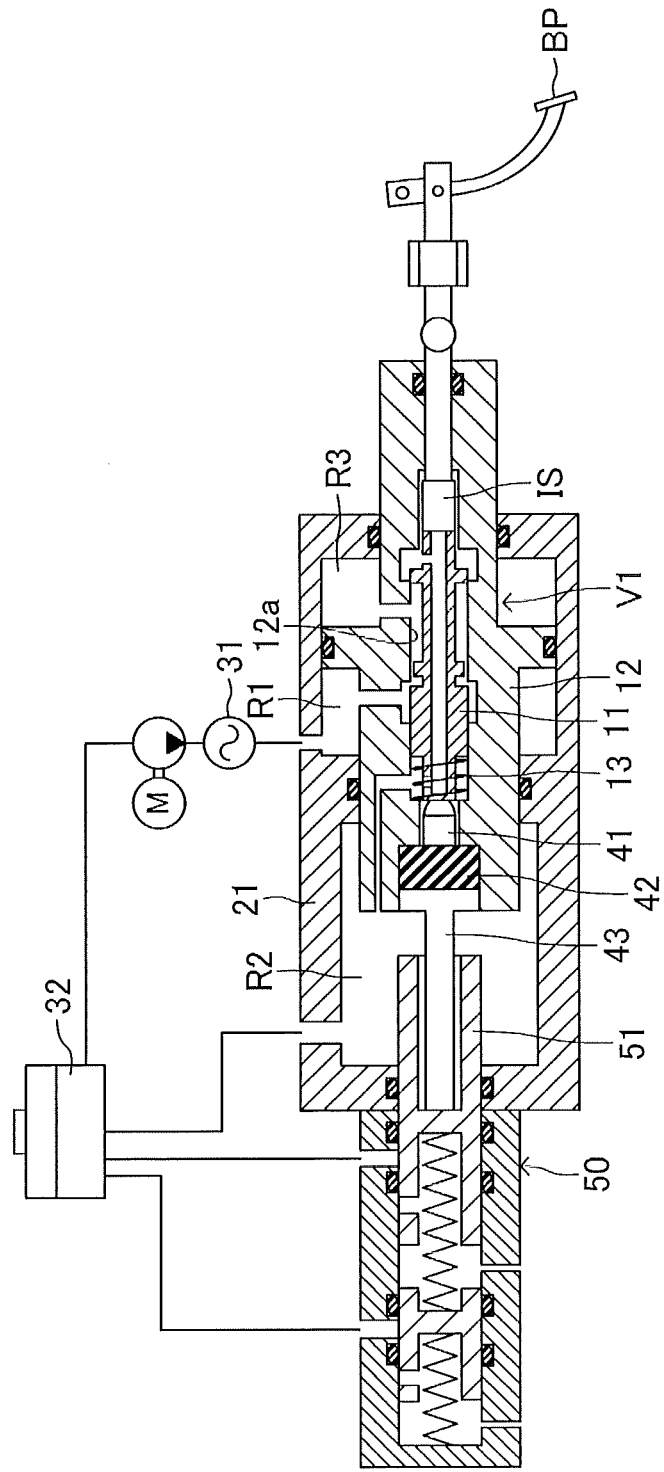
FIG. 1 is a vertically-sectioned side view schematically showing an embodiment in which a spool valve according to the present invention is applied to a hydraulic brake apparatus of a vehicle (a first embodiment of the spool valve according to the present invention).
Figure 2:
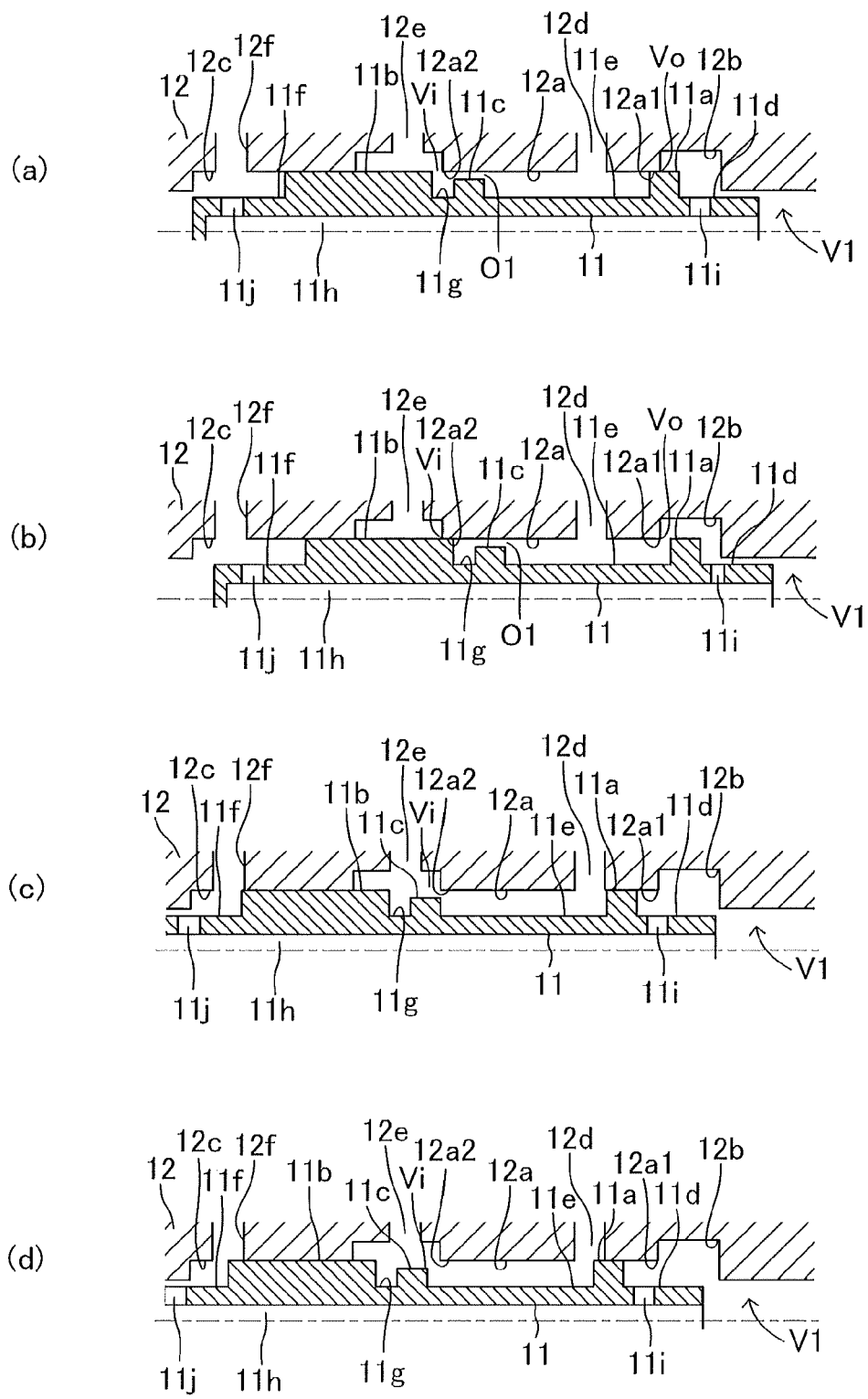
FIG. 2 is a set of enlarged cross-sectional views of a main portion of the spool valve shown in FIG. 1, wherein (a) shows a state when a valve element moves in the axial direction from its initial position and a throttle portion starts its function (at a time indicated by So in FIG. 3), (b) shows a state in which the valve element is located at the initial position, (c) shows a state when the throttle portion ends its function after the valve element has moved in the axial direction from the initial position by a predetermined amount (at a time indicated by S1 in FIG. 3), and (d) shows a state after the amount of the axial movement of the valve element from the initial position has exceeded the predetermined amount.
Figure 3:
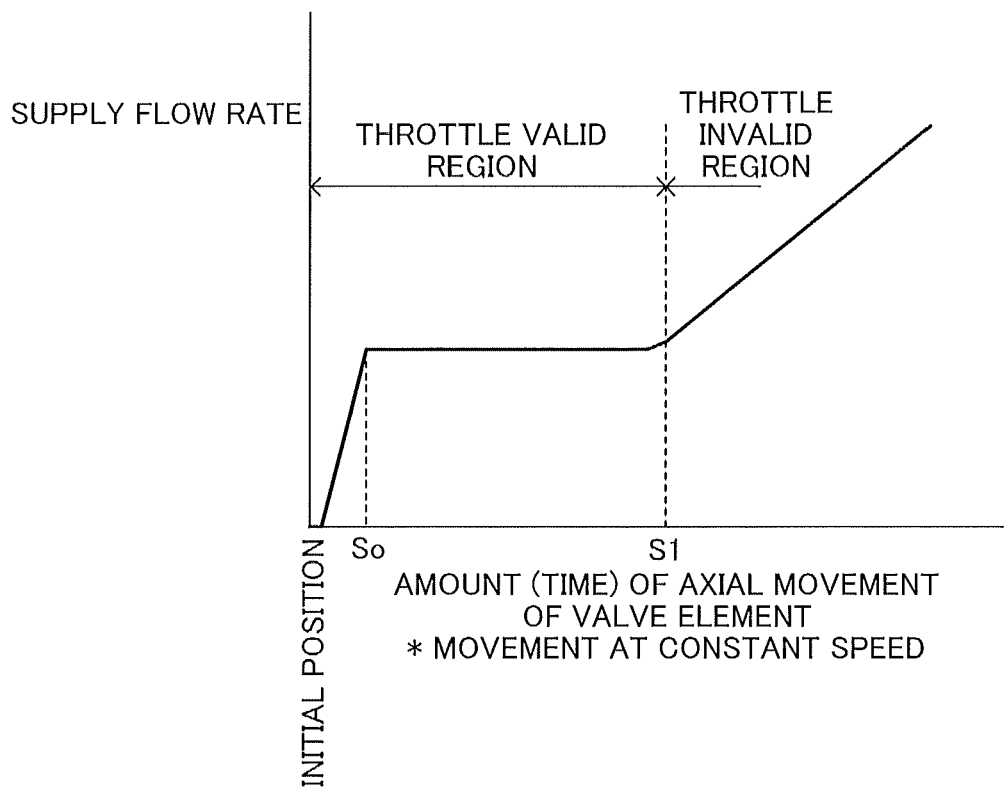
FIG. 3 is a diagram schematically showing the relation between the amount of movement of the valve element of the spool valve shown in FIG. 1 and the flow rate of fluid supplied from a hydraulic pressure source to a hydraulic chamber.

Embodiments of the present invention will now be described with reference to the drawings. FIGS. 1 to 3 show a first embodiment of a spool valve according to the present invention. In a spool valve V1 according to this first embodiment, a valve element (spool) 11 is received in a bore 12$a$ of a cylinder (sleeve piston) 12 such that the valve element 11 is movable in the axial direction. When a brake pedal BP is stepped on, the valve element 11 is pushed by an input shaft IS toward the left side in the drawings (toward the front of a vehicle).

The cylinder 12 is assembled to a housing 21 to be movable in the axial direction. A high pressure chamber R1, a low pressure chamber R2, and a hydraulic chamber R3 are formed in the housing 21. The high pressure chamber R1 always communicates with a hydraulic pressure source (accumulator) 31. The low pressure chamber R2 always communicates with a reservoir 32. The hydraulic chamber R3 communicates with the high pressure chamber R1 or the low pressure chamber R2 as a result of operation of the spool valve V1. The movements of the valve element 11 and the cylinder 12 toward the left side in the drawings are transmitted to a piston 51 of a brake master cylinder 50 via a rod 41, a reaction rubber disc 42, an output shaft 43, etc. which are assembled to the cylinder 12.

The spool valve V1 includes not only the valve element 11 and the cylinder 12, but also a return spring 13 which is disposed between the valve element 11 and the cylinder 12 and urges the valve element 11 toward the initial position. As shown in FIG. 2, the valve element 11 has large diameter shaft portions 11$a$, 11$b$ having the same diameter, an intermediate diameter shaft portion 11$c$, and small diameter shaft portions 11$d$, 11$e$, 11$f$ having the same diameter. The valve element 11 also has an annular groove 11$g$, an axial hole 11$h$, and communication holes 11$i$, 11$j$.

The right-hand-side large diameter shaft portion 11$a$ is a portion which is fitted into a right end portion 12$a$1 of the bore 12$a$ of the cylinder 12 such that the large diameter shaft portion 11$a$ is slidable in the axial direction. The right-hand-side large diameter shaft portion 11$a$ forms a discharge valve port Vo in cooperation with the right end portion 12$a$1 of the bore 12$a$. The left-hand-side large diameter shaft portion 11$b$ is a portion which is fitted into an intermediate portion 12$a$2 of the bore 12$a$ of the cylinder 12 such that the large diameter shaft portion 11$b$ is slidable in the axial direction. The left-hand-side large diameter shaft portion 11$b$ forms a supply valve port Vi in cooperation with the intermediate portion 12$a$2 of the bore 12$a$.

The intermediate diameter shaft portion 11$c$ is formed between the large diameter shaft portions 11$a$, 11$b$, and has a throttle-forming surface which is formed on the outer circumferential surface thereof and which has a predetermined width. The throttle-forming surface forms a throttle portion O1 in cooperation with the wall surface of the bore 12$a$ of the cylinder 12. The right-hand-side small diameter shaft portion 11$d$ is formed at the right end of the valve element 11, and is inserted into a stepped hole 12$b$ of the cylinder 12 located on the right side in the drawings such that the small diameter shaft portion 11$d$ can move in the axial direction. The middle small diameter shaft portion 11e is formed between the large diameter shaft portion 11a and the intermediate diameter shaft portion 11c of the valve element 11 and is axially movable within the bore 12a of the cylinder 12. The left-hand-side small diameter shaft portion 11f is formed at the left end of the valve element 11, and is inserted into a stepped hole 12c of the cylinder 12 located on the left side in the drawings such that the small diameter shaft portion 11f can move in the axial direction.

The axial hole 11h is coaxially formed at the center of the valve element 11. The axial hole 11h is open at the right end thereof and is closed at the left end thereof. The right-hand-side communication hole 11i is formed in the small diameter shaft portion 11d so as to establish continuous communication between the right-hand-side stepped hole 12b and the axial hole 11h. The left-hand-side communication hole 11j is formed in the small diameter shaft portion 11f so as to establish continuous communication between the left-hand-side stepped hole 12c and the axial hole 11h.

The discharge valve port Vo is formed between the valve element 11 and the cylinder 12. When the valve element 11 is located at an initial position (the position shown in section (b) of FIG. 2), the discharge valve port Vo is open. When the valve element 11 in the initial position axially moves in relation to the cylinder 12 against the urging force of the return spring 13, the discharge valve port Vo closes (see sections (a), (c), and (d) of FIG. 2). The supply valve port Vi is formed between the valve element 11 and the cylinder 12. When the valve element 11 is located at the initial position (the position shown in section (b) of FIG. 2), the supply valve port Vi is closed. When the valve element 11 in the initial position axially moves in relation to the cylinder 12 against the urging force of the return spring 13, the supply valve port Vi opens after the discharge valve port Vo closes.

The throttle portion O1 is provided in a fluid channel formed on the hydraulic chamber R3 side of the supply valve port Vi. The throttle portion O1 is located at a position which is axially shifted by a predetermined amount from an end of the outer circumferential surface of the valve element 11, which end forms the supply valve port Vi. The throttle portion O1 is formed by the bore wall surface of the cylinder 12 and the throttle-forming surface which is formed on the outer circumferential surface of the valve element 11 and which has a predetermined width (the outer circumferential surface of the intermediate diameter shaft portion 11c). In this throttle portion O1, the area of the opening formed between the valve element 11 and the cylinder 12 is constant in a throttle valid region which extends from the initial position to a position where the axial movement amount of the valve element 11 from the initial position becomes equal to a predetermined value S1, and the opening area increases in a throttle invalid region where the axial movement amount of the valve element 11 exceeds the predetermined value S1. The amount of overlap in the axial direction between the bore wall surface of the cylinder 12 and the outer circumferential surface of the intermediate diameter shaft portion 11c which form the throttle portion O1 is set such that the amount of overlap decreases gradually in the vicinity of the predetermined value S1 and becomes zero at the predetermined value S1.

The cylinder 12 has the bore 12a into which the large diameter shaft portions 11a, 11b of the valve element 11 are fitted such that they can slide in the axial direction. The cylinder 12 also has the stepped holes 12b, 12c formed at the opposite ends of the bore 12a. Further, the cylinder 12 has a communication hole 12d for establishing continuous communication between a right end portion of the bore 12a (on the left side of the discharge valve port Vo) and the hydraulic chamber R3, a communication hole 12e for establishing continuous communication between an intermediate portion of the bore 12a (on the left side of the supply valve port Vi) and the high pressure chamber R1, and a communication hole 12f for establishing continuous communication between a large diameter portion of the stepped hole 12c and the low pressure chamber R2.

In the first embodiment configured as described above, when the input shaft IS and the valve element 11 are moved leftward in the drawings from the initial position (return position) as a result of the brake pedal BP being stepped on, in the spool valve V1, the supply valve port Vi opens after the discharge valve port Vo closes. As a result, the communication between the hydraulic chamber R3 and the low pressure chamber R2 is stopped, and the communication between the hydraulic chamber R3 and the high pressure chamber R1 is established, whereby high-pressure working fluid is introduced from the high pressure chamber R1 into the hydraulic chamber R3. Therefore, the cylinder 12 is pushed forward, and the piston 51 of the master cylinder 50 is pushed forward via the reaction rubber disc 42 and the output shaft 43, whereby a desired brake operation is attained. The introduction of the working fluid from the high pressure chamber R1 into the hydraulic chamber R3 is performed through the communication hole 12e, the opened supply valve port Vi, the communication hole 12d, etc.

Also, in the first embodiment, when the brake pedal BP is released, in the spool valve V1, the discharge valve port Vo opens after the supply valve port Vi closes. As a result, the communication between the hydraulic chamber R3 and the high pressure chamber R1 is stopped, and the communication between the hydraulic chamber R3 and the low pressure chamber R2 is established, whereby the working fluid is discharged from the hydraulic chamber R3 into the low pressure chamber R2. Therefore, the piston 51 of the master cylinder 50, the output shaft 43, the reaction rubber disc 42, the spool valve V1, etc. are returned to their initial positions, whereby the brake operation is cancelled. The discharge of the working fluid from the hydraulic chamber R3 into the low pressure chamber R2 is performed through the communication hole 12d, the opened discharge valve port Vo, the communication hole 11i, the axial hole 11h, the communication hole 11j, the communication hole 12f, etc.

Incidentally, in the spool valve V1 of the first embodiment, the above-described throttle portion O1 is provided in the fluid channel formed on the hydraulic chamber R3 side of the supply valve port Vi. Therefore, when the spool valve V1 is configured such that the degree of charging of the working fluid within the hydraulic chamber R3 reaches a certain level in the throttle valid region (see FIG. 3) of the throttle portion O1, the flow rate of the working fluid supplied to the hydraulic chamber R3 at the time when the degree of charging of the working fluid within the hydraulic chamber R3 reaches the certain level can be decreased as compared with the case where the throttle portion O1 is not provided, whereby occurrence of oil impact within the hydraulic chamber R3 can be restrained.

In the spool valve V1 of the first embodiment, occurrence of oil impact within the hydraulic chamber R3 is restrained by the throttle portion O1, and, in the throttle invalid region where the axial movement amount of the valve element 11 from the initial position exceeds the predetermined value S1 (see FIG. 3), the opening area of the above-described throttle portion O1 increases. Therefore, it is possible to restrain an increase in the amount of axial movement of the valve element 11 in relation to the cylinder 12 as compared with the case where a fixed throttle is provided in the fluid channel formed on the hydraulic pressure source side of the supply valve port Vi or in the fluid channel formed on the hydraulic chamber side of the supply valve port Vi, in order to reduce the flow rate of the working fluid supplied to the hydraulic chamber R3 at the time when the degree of charging of the working fluid within the hydraulic chamber R3 reaches a certain level, such that no oil impact occurs (in this case, since the supply flow rate is reduced by the fixed throttle at all times, the amount (time) of axial movement of the valve element in relation to the cylinder must be increased as needed in order to secure the fluid supply amount necessary in the hydraulic chamber R3). Thus, it becomes possible to restrain an increase in the overall length of the spool valve V1 to a possible extent.

In the spool valve V1 of the first embodiment, the throttle portion O1 is located at a position which is axially shifted by a predetermined amount from the end of the outer circumferential surface (the large diameter shaft portion 11b) of the valve element 11, which end forms the supply valve port Vi. The throttle portion O1 is formed by the wall surface of the bore 12a of the cylinder 12 and the throttle-forming surface which is formed on the outer circumferential surface of the intermediate diameter shaft portion 11c of the valve element 11 and which has a predetermined width. The annular groove 11g is formed between the end of the outer circumferential surface (the large diameter shaft portion 11b) of the valve element 11, which end forms the supply valve port Vi and the throttle forming surface (the intermediate diameter shaft portion 11c). Therefore, the throttle valid region can be set properly by properly setting the length of the annular groove 11g in the axial direction.

In the spool valve V1 of the first embodiment, the annular groove 11g and the throttle portion O1 are disposed such that when the valve element 11 is in the initial position, the annular groove 11g and the throttle portion O1 are located near the supply valve port Vi. However, as in the case of a modified embodiment shown in FIG. 4, the present invention may be implemented such that when the valve element 11 is located at the initial position (see section (a) of FIG. 4), the annular groove 11g and the throttle portion O1 are spaced away from the supply valve port Vi by a predetermined amount. In the modified embodiment shown in FIG. 4, as shown in section (a) of FIG. 4, a valve portion A is provided between the supply valve port Vi and the throttle portion O1.

The valve portion A is formed by providing an annular groove B on the wall surface of the bore 12a of the cylinder 12 and providing an annular groove C on the large diameter shaft portion 11b of the valve element 11, whereby a space D is secured between the valve element 11 and the cylinder 12. The valve portion A is closed when the valve element 11 is located at the initial position (see section (a) of FIG. 4), and is opened when the throttle portion O1 starts to function (see section (b) of FIG. 4). Therefore, in this modified embodiment, with the axial movement (leftward movement in FIG. 4) of the valve element 11, the hydraulic pressure changes stepwise between the supply valve port Vi and the throttle portion O1. Accordingly, in this modified embodiment, the clearance accuracy of the throttle portion O1 can be relaxed as compared with the above-described first embodiment.

Figure 4:
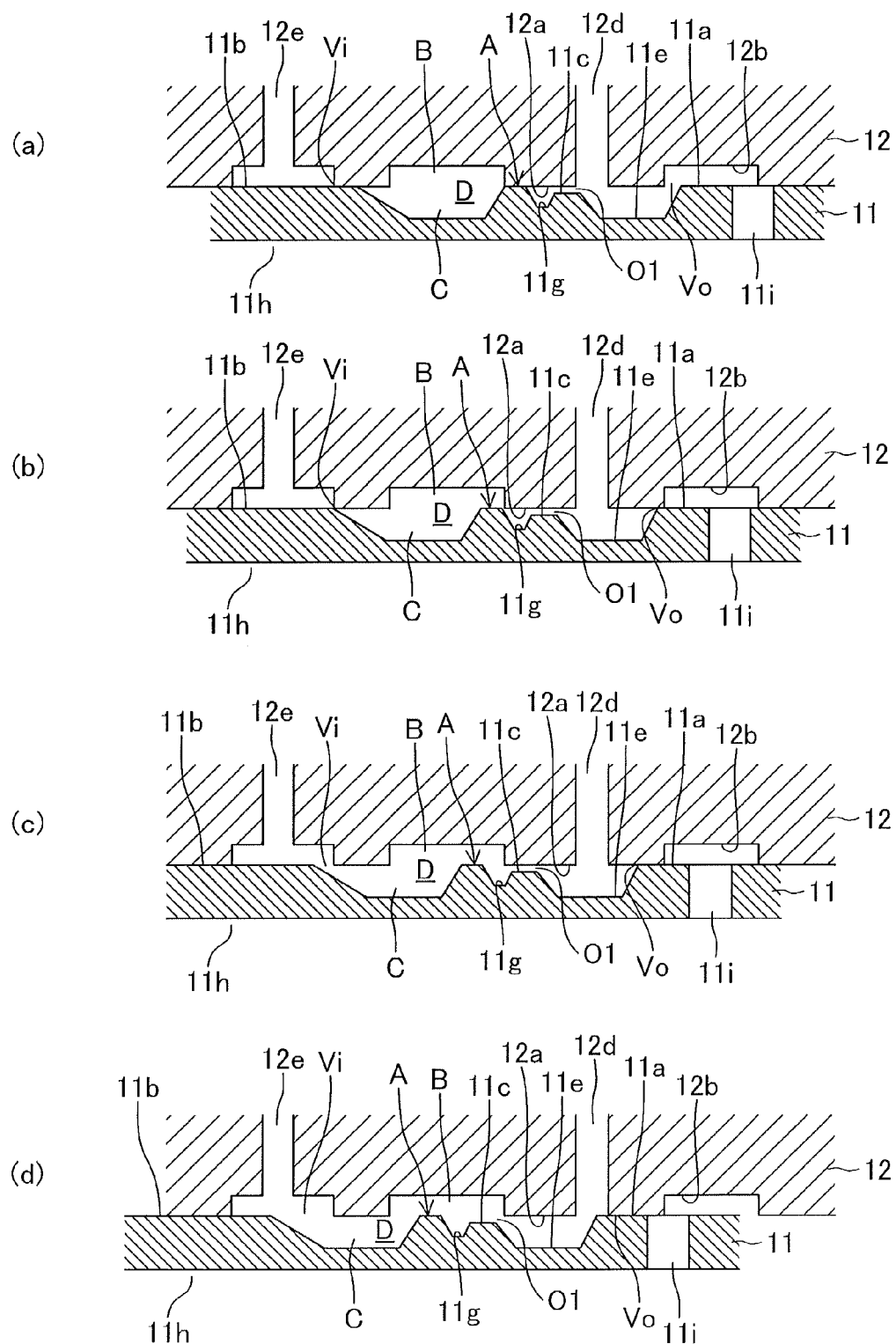
FIG. 4 is a set of enlarged cross-sectional views of a main portion of a spool valve which shows a modification of the spool valve of the first embodiment shown in FIGS. 1 and 2, wherein (a) shows a state in which the valve element is located at its initial position, (b) shows a state when the valve element moves in the axial direction from its initial position and a throttle portion starts its function, (c) shows a state in which the throttle portion is functioning, and (d) shows a state after the amount of the axial movement of the valve element from the initial position has exceeded a predetermined amount.

In the throttle portion O1 shown in FIG. 4, in the throttle valid region which extends from the initial position to a position where the axial movement amount of the valve element 11 from the initial position becomes equal to the predetermined value S1, the area of the opening formed between the valve element 11 and the cylinder 12 is constant (see sections (b) and (c) of FIG. 4), and in the throttle invalid region where the axial movement amount of the valve element 11 exceeds the predetermined value S1, the opening area increases (see section (d) of FIG. 4). The amount of overlap in the axial direction between the bore wall surface of the cylinder 12 and the outer circumferential surface of the intermediate diameter shaft portion 11c which form the throttle portion O1 is set such that the amount of overlap decreases gradually in the vicinity of the predetermined value S1 and becomes zero at the predetermined value S1.

In the spool valve V1 of the first embodiment, the above-described throttle portion O1 is provided in the fluid channel formed on the hydraulic chamber R3 side of the supply valve port Vi. However, as in the case of a spool valve V2 of a second embodiment shown in FIG. 5, a spool valve V3 of a third embodiment shown in FIG. 6, or a spool valve V4 of a fourth embodiment shown in FIG. 7, a throttle portion O2, O3, or O4 may be provided in the fluid channel formed on the hydraulic pressure source (high pressure chamber R1) side of the supply valve port Vi. Since the spool valve V2 of the second embodiment shown in FIG. 5, the spool valve V3 of the third embodiment shown in FIG. 6, and the spool valve V4 of the fourth embodiment shown in FIG. 7 have substantially the same structure as that of the spool valve V1 of the first embodiment except that the throttle portions O2, O3, O4 differ in structure from the throttle portion O1 and that a taper portion 111k is formed between a large diameter shaft portion 111b and a small diameter shaft portion 111e of a valve element 111 such that the diameter of the taper portion 111k decreases toward the small diameter shaft portion. Therefore, the structures of the spool valves V2, V3, and V4 are not described here.

Figure 5:
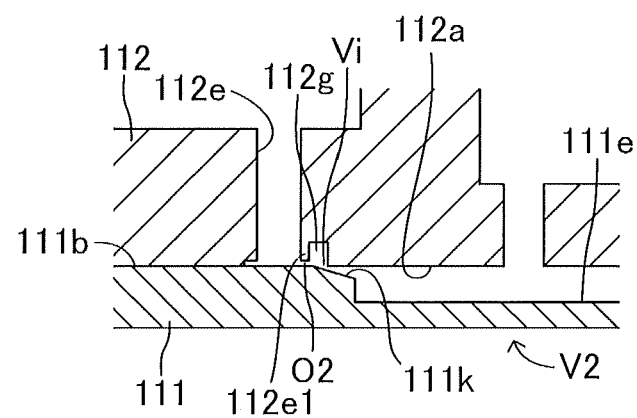
FIG. 5 is an enlarged cross-sectional view of a main portion of a second embodiment of the spool valve according to the present invention.

The throttle portion O2 of the second embodiment shown in FIG. 5 is provided at a position which is axially shifted by a predetermined amount from an end of the wall surface of a bore 112a of a cylinder 112, which end forms the supply valve port Vi. The throttle portion O2 is formed by the outer circumferential surface of the large diameter shaft portion 111b of the valve element 111 and a cylindrical protrusion 112e1 which has a predetermined thickness and is formed along the entire circumference of the inner end of a communication hole 112e. The communication hole 112e is formed in the cylinder 112 and communicates with the bore 112a of the cylinder 112 at its inner end. Also, in the second embodiment shown in FIG. 5, a recess 112g is formed between the cylindrical protrusion 112e1 and the end of the wall surface of the bore 112a of the cylinder 112, which end forms the supply valve port Vi. Therefore, the throttle valid region can be set properly by properly setting the length of the recess 112g in the axial direction.

Figure 6:
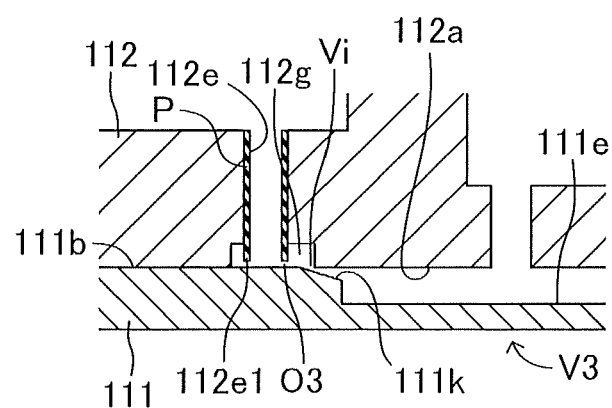
FIG. 6 is an enlarged cross-sectional view of a main portion of a third embodiment of the spool valve according to the present invention.

In the throttle portion O3 of the third embodiment shown in FIG. 6, the connection hole 112e and the cylindrical protrusion 112e1 are formed by a pipe P which is liquid-tightly assembled to the cylinder 112. Since the structure of the remaining portion is substantially identical to that of the throttle portion O2 of the second embodiment shown in FIG. 5, its description is omitted. In this third embodiment, the degree of throttling at the throttle portion O3 can be readily adjusted by changing (adjusting) the amount of insertion (fitting) of the pipe P into the cylinder 112.

Figure 7:
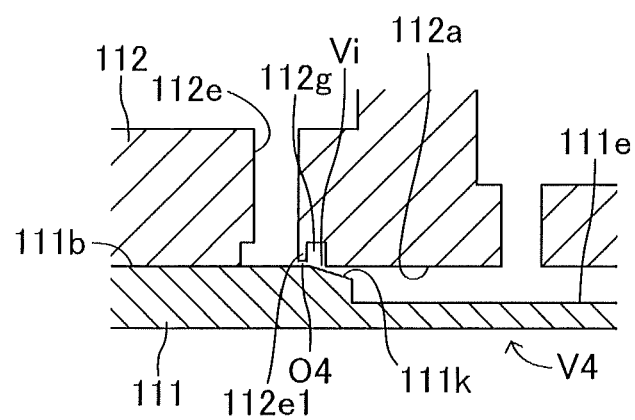
FIG. 7 is an enlarged cross-sectional view of a main portion of a fourth embodiment of the spool valve according to the present invention.

The throttle portion O4 of the fourth embodiment shown in FIG. 7 is provided at a position which is axially shifted by a predetermined amount from the end of the wall surface of the bore 112a of the cylinder 112, which end forms the supply valve port Vi. The throttle portion O4 is formed by the outer circumferential surface of the large diameter shaft portion 111b of the valve element 111 and a flange-shaped protrusion 112e1. The protrusion 112e1 projects from the wall surface of the bore 112a of the cylinder 112 toward the outer circumferential surface of the valve element 111 at a position between the inner end of the communication hole 112e which is formed in the cylinder 112 and communicates with the bore 112a of the cylinder 112 at its inner end, and the end of the wall surface of the bore 112a of the cylinder 112, which end forms the supply valve port Vi. The flange-shaped protrusion 112e1 has a predetermined width and extends annularly around the axis of the valve element 111. Also, in the fourth embodiment shown in FIG. 7, the annular recess 112g is formed between the flange-shaped protrusion 112e1 and the end of the wall surface of the bore 112a of the cylinder 112, which end forms the supply valve port Vi. Therefore, the throttle valid region can be set properly by properly setting the length of the recess 112g in the axial direction.

In the spool valve V2 of the second embodiment shown in FIG. 5, the spool valve V3 of the third embodiment shown in FIG. 6, and the spool valve V4 of the fourth embodiment shown in FIG. 7, since the taper portion 111k tapered off toward the small diameter shaft portion 111e is formed between the large diameter shaft portion 111b and the small diameter shaft portion 111e of the valve element 111. Therefore, the increase gradient of the supply flow rate in the throttle invalid region can be decreased as compared with the first embodiment. Accordingly, such a structure (formation of a taper portion between the large and small diameter shaft portions of the valve element such that the diameter of the taper portion decreases toward the small diameter shaft portion) can be similarly employed in the first embodiment.

In the above-described embodiments, the present invention is implemented such that as a result of axial movement of the valve element 11 from the initial position in relation to the cylinder 12, the supply valve port Vi opens after the discharge valve port Vo formed between the valve element 11 and the cylinder 12 closes. However, the timing at which the supply valve port (Vi) opens can be changed freely. For example, the spool valve of the resent invention may be configured such that the supply valve port opens simultaneously with the closure of the discharge valve port or may be configured such that the supply valve port opens (immediately) before the discharge valve port closes.

In the above-described embodiments, the present invention is applied to a spool valve used in a hydraulic brake apparatus of a vehicle. However, the present invention can be applied to other spool valves used in other various hydraulic apparatuses in the same manner as in the above-described embodiment or with proper modifications, and the present invention is not limited to the above-descried embodiments.

The invention claimed is:

1. A spool valve which comprises a valve element and a cylinder having a bore which accommodates the valve element to be movable in an axial direction and which is configured such that when the valve element in an initial position moves in the axial direction in relation to the cylinder, a supply valve port formed between the valve element and the cylinder opens after a discharge valve port formed between the valve element and the cylinder closes, whereby a working fluid is introduced from a hydraulic pressure source into a hydraulic chamber through the supply valve port, wherein a throttle portion is provided in a fluid channel formed between the supply valve port and the hydraulic pressure source or a fluid channel formed between the supply valve port and the hydraulic chamber, the throttle portion being configured such that the area of an opening formed between the valve element and the cylinder is constant in a throttle valid region which extends from the initial position to a predetermined position which is a position where the amount of axial movement of the valve element from the initial position becomes equal to a predetermined value and where the supply valve port remains open while the discharge valve port remains closed, the area of the opening increases in a throttle invalid region where the amount of axial movement of the valve element exceeds the predetermined value, the throttle portion is formed by a wall surface of the bore of the cylinder and a throttle-forming surface which is formed on an outer circumferential surface of the valve element and which has a predetermined width; wherein the wall surface and the throttle-forming surface form an axial overlap while the valve element moves in a first direction from the initial position to the predetermined position; wherein further movement of the valve element in the same direction past the predetermined position causes the throttle-forming surface to fully clear a corner of the bore.

2. A spool valve according to claim 1, wherein the throttle portion is provided at a position which is axially shifted by a predetermined amount from an end of an outer circumferential surface of the valve element, which end forms the supply valve port; and an annular groove is formed between the throttle-forming surface and the end of the outer circumferential surface of the valve element, which end forms the supply valve port.

* * * * *